United States Patent [19]
Haurat et al.

[11] 3,890,723
[45] June 24, 1975

[54] DUMMY, IN PARTICULAR FOR VEHICLE OR VEHICLE ACCESSORY TESTS

[75] Inventors: Edouard Haurat, Valentigney; Roland Bouclet, Audincourt, both of France

[73] Assignees: Automobiles Peugeot, Paris; Regie Nationale des Usines Renault, Boulogne-Billancourt, both of France

[22] Filed: Feb. 4, 1974

[21] Appl. No.: 439,282

[30] Foreign Application Priority Data
Feb. 20, 1973 France .............................. 73.05891

[52] U.S. Cl. .................................................. 35/17
[51] Int. Cl. ......................................... G09b 23/00
[58] Field of Search........ 35/17; 46/162; 280/150 SB

[56] References Cited
UNITED STATES PATENTS
1,384,731 7/1921 Richards ................................ 35/17
2,213,270 9/1940 Chase ..................................... 35/17

FOREIGN PATENTS OR APPLICATIONS
1,323,722 4/1963 France .................................. 35/17

Primary Examiner—Harland S. Skogquist
Attorney, Agent, or Firm—Burns, Doane, Swecker & Mathis

[57] ABSTRACT

Intended to replace ballast constituted by sacks of sand or iron castings and costly articulated dummies. It defines a reservoir of plastics material and has the shape of a trunk of a human body including a part of the thighs in a seated and closed position of the thighs. There are provided means for rapidly filling and emptying the reservoir, handles in the regions of the armpits and grooves for receiving safety belts for attaching the dummy to a support such as a vehicle seat.

10 Claims, 2 Drawing Figures

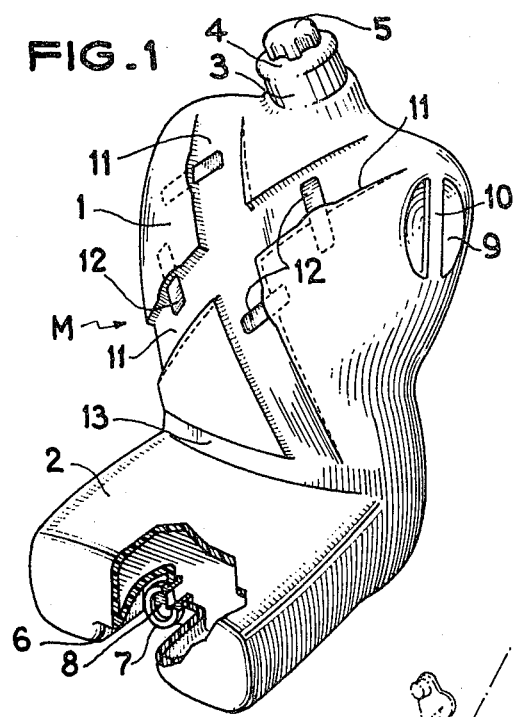
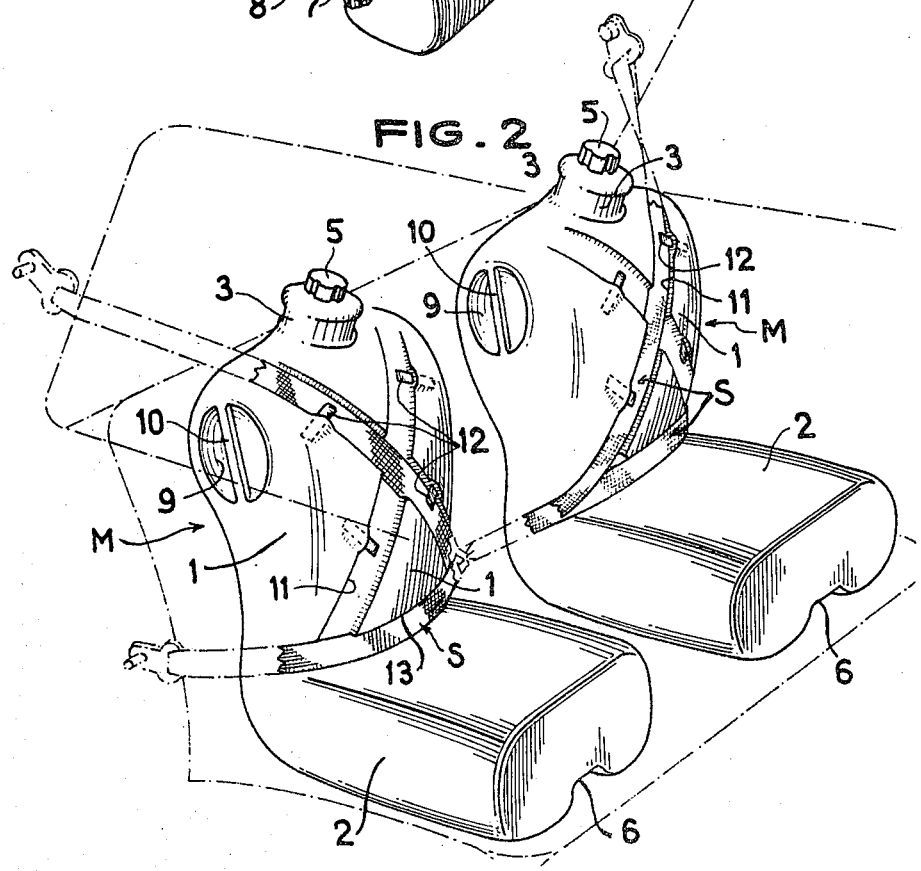

DUMMY, IN PARTICULAR FOR VEHICLE OR VEHICLE ACCESSORY TESTS

The present invention relates to dummies employed in particular for carrying out tests on vehicles or accessories such as safety belts for such vehicles.

In order to test under load vehicles such as touring-cars, there is at the present time employed ballast constitued by sacks of sand or pig iron, this ballast corresponding to the weight of one or more passengers. Such ballast is difficult to handle and moreover must be attached by means of metal or wooden frames. Further, they are difficult to place in position on vehicle seats and usually must be placed on the floor — which abnormally lowers the centre of gravity of the vehicle and does not enable the test to be carried out with all the necessary precision.

Articulated dummies also exist which reproduce as nearly as possible the morphology of the human body and which, when placed in position on the vehicle seats, permit studying, upon braking or a collision, the behaviour of the dummy, the windshield of the vehicle, the safety belt or some other accessory. However, these dummies are relatively complex in construction and therefore expensive. Their use is therefore not justified in certain types of tests and in particular simple stress tests of vehicles.

An object of the present invention is to provide a dummy which does not have the drawbacks of the two known types of equipement described hereinbefore and which permits carrying out under good conditions stress tests of a vehicle or tests of its various accessories.

A dummy according to the invention constitues a reservoir for a liquid, such as water, this reservoir having the shape of the trunk of a human body and having rapid filling and emptying means.

According to another feature of the invention, the reservoir has a generally L-shape and reproduces the shape of the trunk of an individual and a part of the thighs in their closed and seated position. With such a shape the reservoir is particularly stable since it has a large seating area.

According to another feature of the invention, the reservoir-dummy has means for positioning and maintaining safety belts and preferably means whereby the dummy may be easily handled, the last-mentioned means being, for example, constitued by handles disposed across hollow portions in the region of the arm pits.

Further features and advantages of the invention will be apparent from the ensuing description with reference to the accompanying drawing.

IN THE DRAWING

FIG. 1 is a perspective view, with a part cut away, of a dummy according to the invention, and FIG. 2 is a perspective view of two dummies placed in a vehicle.

The drawing shows a dummy M according to the invention which constitues a reservoir or tank having the shape of the human trunk. Indeed, in the illustrated embodiment, the dummy has a generally L-shape and reproduces at 1 the shape of the trunk completed at 2 by a part of the thighs in the closed and seated position. This reservoir may be of a simple plastics material obtained by any manufacturing process, such as extrusion-blowing, rotary moulding or other process.

The dummy has in the region of the neck 2 a filling orifice 4 which may be closed by a stopper 5 which is rapidly opened and closed. The dummy further has in its lower part, for example in a reinforcement 6 provided along the front and lower edge of its base, a rapid emptying orifice 7. The latter may be normally closed by a valve 8 which is maintained in the closing position by resiliently-yieldable means (not shown) and which upon the introduction of a drain pipe which terminates in a suitably shaped connector, is moved away from its valve seat so as to allow the draining of the liquid. The reservoir has in the region of the arm pits two recessed portions 9 each of which is partly covered by a transverse bar 10 constituting a handle for handling the reservoir.

Moreover, it will be observed that on the front face of the dummy there are provided two recesses or grooves 11 which define an X-shape and are provided with tabs 12 constituted by members which are secured by any suitable means to the reservoir. These attached members are preferably disposed on each side of the grooves so as to ensure the correct positioning and maintenance of safety belts.

Likewise, in the region of the waist there is provided another groove 13 which also permits the maintenance and positioning of an abdominal safety belt.

Such a dummy is employed in a very simple manner.

When empty, it is relatively light and can be handled and placed in position in a vehicle. When it is placed on a seat as shown in FIG. 2, the safety belts S are placed in either of the two grooves 11, depending on whether the dummy is located on the left or right side, and the dummy is filled with water through the upper orifice 4. The tests can then be carried out normally and it will be observed that the distribution of the masses practically corresponds to the distribution obtained when a person occupies the seat of the vehicle.

When the test has been carried out, it is sufficient to connect to the drain connector 7 a suitable pipe and open the stopper 5 so as to rapidly empty the reservoir. The dummy then resumes its empty weight and can be easily handled.

It can be seen therefore that such a dummy permits overcoming the drawbacks of conventional devices since it is cheap and may be mass-produced and, when empty, is very light and easy to handle. On the other hand, when it is placed in position and filled with liquid, it is sufficiently similar to a real person to carry out in a satisfactory manner certain types of tests.

We claim:

1. A dummy, in particular for carrying out tests on vehicles or automobile accessories, the dummy comprising an outer wall defining a cavity which constitutes a reservoir for a liquid, such as water, the wall defining outwardly an outer surface having substantially the shape and size of the trunk of a human body, the reservoir being closed except for the provision of reservoir filling means and reservoir emptying means and means for closing the emptying means, the filling means being in the upper part of the trunk and the emptying means in the lower part of the trunk in an upright position of the trunk and the cavity having a volume which is a major part of the volume defined by said outer surface of the wall whereby, when the reservoir is substantially filled with said liquid and the dummy is in use, the dummy has substantially the weight of a human trunk and, when the reservoir is empty, the dummy is considerably lighter and can be easily handled and carried.

2. A dummy as claimed in claim 1, comprising two recessed portions in regions of the wall corresponding to arm pits of the human body and a bar extending across each recessed portion and constituting a handle for handling the dummy.

3. A dummy as claimed in claim 1, wherein the filling means consist of an orifice disposed in the region of the wall corresponding to the neck of the human body, a stopper being provided for closing the filling orifice.

4. A dummy as claimed in claim 1, wherein the emptying means consist of a drain orifice and the closing means comprise a valve and resiliently-yieldable means for biasing the valve to an emptying orifice closing position.

5. A dummy, in particular for carrying out tests on vehicles or automobile accessories, the dummy comprising an outer wall defining a cavity which constitutes a reservoir for a liquid, such as water, the wall defining outwardly an outer surface having substantially an L-shape and substantially reproduces the shape of the trunk of a human body completed by a part of the body's thighs which are in a closed and seated position, means for positioning and maintaining safety belt means on the wall, the reservoir being closed except for the provision of reservoir filling means and reservoir emptying means and means for closing the emptying means, the filling means being in the upper part of the trunk and the emptying means in the lower part of the trunk in an upright position of the trunk and the cavity having a volume which is a major part of the volume defined by said outer surface of the wall whereby, when the reservoir is substantially filled with said liquid and the dummy is in use, the dummy has substantially the weight of a human trunk and, when the reservoir is empty, the dummy is considerably lighter and can be easily handled and carried.

6. A dummy as claimed in claim 5, wherein said positioning means comprise an X-shaped arrangement of grooves on a front surface of the dummy.

7. A dummy, in particular for carrying out tests on vehicles or automobile accessories, the dummy defining a reservoir for a liquid, such as water, and having the shape of the trunk of a human body and including filling and emptying means, an X-shaped arrangement of grooves on a front surface of the dummy for positioning and maintaining safety belt means on the dummy and belt means retaining members extending from edges of said grooves.

8. A dummy as claimed in claim 7, wherein each groove has at least one retaining member extending from each of its edges.

9. A dummy, in particular for carrying out tests on vehicles or automobile accessories, the dummy comprising means defining an outer surface having substantially the shape and size of the trunk of a human body, means defining an inner reservoir for a liquid, such as water, which reservoir is closed except for the provision of reservoir filling means and reservoir draining means and releasable means for closing the draining means, the filling means being located in the upper part and the draining means being located in the lower part of the trunk when the trunk is in an upright position and the reservoir having a volume which is a major part of the volume defined by said outer surface whereby, when the reservoir is substantially filled with said liquid and the dummy is in use, the dummy has substantially the weight of a human trunk and, when the reservoir is empty, the dummy is considerably lighter and can be easily handled and carried.

10. A dummy as claimed in claim 9, wherein the outer surface has a generally L-shape and reproduces the shape of the trunk of a human body completed by a part of the body's thighs which are in a closed and seated position.

* * * * *